United States Patent [19]

Racey

[11] Patent Number: 4,907,186
[45] Date of Patent: Mar. 6, 1990

[54] DATA DIRECT INGEST SYSTEM

[75] Inventor: Douglas R. Racey, Boyce, Va.

[73] Assignee: The United States of America as represented by the Secretary of Commerce, Washington, D.C.

[21] Appl. No.: 12,700

[22] Filed: Feb. 9, 1987

[51] Int. Cl.[4] .......................... H04J 3/22; H04J 3/24; H04L 25/36

[52] U.S. Cl. .................................. 364/900; 375/118; 370/84; 370/94.1; 370/102

[58] Field of Search ... 364/200 MS File, 900 MS File, 364/900, 200; 370/100, 104, 110.1, 102, 84, 85; 377/28

[56] References Cited

U.S. PATENT DOCUMENTS

| | | | |
|---|---|---|---|
| 4,062,059 | 12/1977 | Suzuki et al. | 364/900 |
| 4,187,394 | 2/1980 | Sievers | 375/36 |
| 4,288,860 | 9/1981 | Trost | 364/900 |
| 4,300,232 | 11/1981 | Kato | 370/100 |
| 4,314,355 | 2/1982 | Leigbou et al. | 364/900 |
| 4,504,943 | 3/1985 | Nagano et al. | 370/84 |
| 4,512,026 | 4/1985 | Vander Meiden | 370/100 |
| 4,542,500 | 9/1985 | Jean-Claude | 370/102 |
| 4,558,445 | 12/1985 | Novick | 370/102 |
| 4,594,728 | 6/1986 | Niquel et al. | 370/108 |
| 4,596,026 | 6/1986 | Cease et al. | 370/102 |
| 4,625,308 | 11/1986 | Kim et al. | 370/104 |
| 4,642,797 | 2/1987 | Hoberman | 364/900 |
| 4,649,536 | 2/1987 | Utsumi | 370/100 |
| 4,658,152 | 4/1987 | Walters | 370/99 |
| 4,692,859 | 9/1987 | Ott | 364/200 |
| 4,694,426 | 9/1987 | Mason | 377/28 |
| 4,701,913 | 10/1987 | Nelson | 370/110.1 |
| 4,727,542 | 2/1988 | Rokugo et al. | 370/110.1 |
| 4,740,962 | 4/1988 | Kish | 370/102 |
| 4,748,618 | 5/1988 | Brown et al. | 370/99 |
| 4,750,149 | 6/1988 | Miller | 364/900 |
| 4,755,988 | 7/1988 | Nelson et al. | 370/118 |
| 4,759,014 | 7/1988 | Decker et al. | 370/110.1 |
| 4,763,318 | 8/1988 | Westbrook et al. | 370/100 |
| 4,771,425 | 9/1988 | Baran et al. | 370/118 |
| 4,771,426 | 9/1988 | Rattlingourd et al. | 370/102 |
| 4,809,269 | 2/1989 | Gulick | 370/94 |

Primary Examiner—Andrew J. James
Assistant Examiner—Viet Q. Nguyen
Attorney, Agent, or Firm—Thomas Zack; Alvin J. Englert; Harold L. Novick

[57] ABSTRACT

An electronic interface circuit and method for receiving high speed serial data, converting the data to parallel data and multiplexing different types of data together with a temporary buffer storage utilizing a First-In-First-Out (FIFO) buffer memory and controllable output interface circuits and signals is provided. Sources of the data can be, for example, a frame synchronizer used to process high speed data from a TIROS-N satellite. The circuitry of a specific embodiment includes line receivers for receiving the data and a controllable output register and line drivers for providing the output data. The input data includes a synchronizing clock signal and control signals and three types of data. A serial to parallel data converter converts the appropriate data and controllable tri-state buffers determine the sequence of providing the data to an internal data bus connected to the input of the FIFO memory.

13 Claims, 6 Drawing Sheets

FIG. 2d
FROM FIG. 2b
FROM FIG. 2c

DATA DIRECT INGEST SYSTEM

FIELD OF THE INVENTION

The present invention relates to an interface system for interconnection between a data source and a data utilization system. In particular, the present invention relates to a data ingest system that can accept a high rate of serial data, convert the data to parallel, multiplex in different types of data, and provide the output data together with the necessary interfacing signals to another computer system, such as computer mainframe, such as an IBM 4300 computer series system.

BACKGROUND OF THE INVENTION

There is now a need to provide an interface system to accept a high rate of serial data supplied from such sources as satellite receiving systems, weather satellites, commercial communication circuits, and other electronic devices possessing synchronous serial interfaces. These data sources often provide in addition to the information data, two other categories of data and their own synchronous clock signals. A first type of data is called the serial quality data that is used for parity correlation and which is accomplished by a separate quality data clock. The other group of data which is processed simultaneously with the serial data and the quality data is status information usually necessary for manipulating or otherwise checking on the received data. For example, this data can include a frame beginning signal and a frame ending signal.

In most cases, however, the data sources that provide this high speed, multiple kinds of data, supply such data in a broadcast form. Therefore, the receiving station does not have the ability to control the rate, duration, or kind of data being sent. In a particular example, the National Oceanic and Atmospheric Administration, National Environmental Satellite, Data and Information Service presently operates weather satellite data processing systems and facilities. These facilities receive weather data from polar-orbiting TIROS-N and geostationary GOES satellites and must ingest, process, archive and distribute this data. As a result of a much larger source of data being provided at a much larger increase in data speeds, there is a need for updating computer hardware and other processing electronics that have become obsolete in view of the electronics and techniques being used with these new data sources.

In addition, there is also a need for an interface system that has flexible output characteristics. For example, there is a requirement that the information transmitted by satellites and processed by the receiving high speed computers on the Earth be further transformed or modified so that the data can be utilized in various conventional, computer mainframe systems, such as the IBM 4300 series computer systems and also, by minicomputer systems, such as the DEC family of computers. These systems usually utilize a data input architecture called the Digital Equipment Corporation UNIBUS specifications. These specifications are used by, for example, an IBM Device Attachment Control Unit (DACU) and other computer interface control systems. As such, these utilization system input devices, such as the DACU, require that the supplied data be buffered and supplied in predetermined, and prespecified packages of data.

In addition, there is also a need to supply the weather satellite information and other high speed data to other computer systems or to high speed parallel input output interfaces using data ready-acknowledge control signals or other hand-shaking signals.

One known method and apparatus of handling data in interface circuits is by using a conventional First-In-First-Out (FIFO) buffer memory. Examples of such circuits are disclosed in the U.S. Pat. Nos. 4,062,059 to Suzuki et al.; 4,525,673 to Berkowitz; 4,288,860 to Trost; and 4,236,225 to Jansen.

The Suzuki et al patent discloses an information processing system that has a buffer control circuit for detecting the full and empty states of a FIFO stack and produces a "FULL" signal when the memory capacity of the stack is filled. The device of the Suzuki et al patent is primarily used between two Information Processing Systems (IPS) where the first IPS provides program control information for register conditioning and status retrieval.

The Berkowitz patent discloses data acquisition apparatus whose central component is a FIFO buffer 30 which has an input register 34 and an output register 36. A sequence of digital words presented to FIFO buffer 30 are stored in successive locations therein and a logic 32 generates command pulses for advancing the data through the successive addresses from the input register 34 to the output register 36. However, the circuit of the Berkowitz patent is extremely complex and is not very versatile. The FIFO buffer is used for storing command words to accomplish the control and data acquisition tasks for the timely and orderly performance of the circuit. As such, the FIFO buffer is really a sequence buffer. Consequently, because of the inflexibility of this circuitry, the circuit cannot be used for the acquisition of high speed serial data, nor produce the appropriate interfacing signals for the receiving IPS.

The Trost patent discloses a FIFO buffer in which a variable oscillator clocks data from the buffer into a storage subsystem at a relatively slow rate. As the buffer begins to fill, the oscillator frequency is increased to cause the data to be clocked from the buffer and into the storage subsystem at a higher ate. As such, the objective of the circuitry disclosed in the Trost patent is to transfer parallel data words initiated by a requesting device to and from a storage memory via a FIFO buffer. The circuit does not have much flexibility because data cannot be read or written into the FIFO buffer during refresh intervals.

The Jansen et al patent discloses a FIFO memory and also utilizes status signals. The input to the FIFO memory is variable while the output is fixed. However, the design of the circuit limits its flexibility and utilization in extremely high speed broadcasted data environment.

Two other U.S. Pat. Nos. 4,272,829, to Schmidt and 4,314,355 to Leigh disclose interface circuits using interim storage devices. The circuit disclosed in the Schmidt et al patent uses parallel register circuits 102 and 104 that are preceded by plural data buses. The Leighou et al patent discloses a plurality of digital data processors, each being associated with a corresponding channel and each including a storage device with means for sensing the occurence of a synchronizing signal.

Obviously, there are also other interface circuits currently in use. However, none of these circuits provide the capabilities of a flexible output with self generated control signals and an input capability by receiving high speed, broadcasted serial data. In addition, none of these circuits also perform the necessary multiplexing when the supplied data contains different kinds of data that has to be properly interleaved at the appropriate times. Furthermore, because of the broadcast nature of the data, it is also necessary to provide a circuit that can include the timing circuits to make a high speed serial to parallel conversion before the data multiplexing occurs.

SUMMARY OF THE INVENTION

Accordingly, there is a need for a circuit utilizing modern, up-to-date circuit components and techniques to accept high rate serial data, to convert the data and to multiplex it with other received data in a temporary storage buffer. There is also a need for a circuit that can produce the requisite output hand-shaking signals so that the interface can be connected to a plurality of different data receivers, such as mainframe computers or minicomputers.

The present invention provides such an interface circuit and method for handling the data transmitted by high speed sources such as weather satellites, and other commercial communication circuits. The interface of the present invention satisfies both the input requirements and the output requirements by providing a FIFO buffer that can be simultaneously, asynchronously written into and read from. The present invention utilizes a clock signal provided with the data in order to regulate the internal timing of the interface so that the data handling capabilities of the present invention are independent of the data supply requirements of the device to which the data is to be transferred.

According to a specific embodiment of the present invention, the present invention includes an input interface, a serial to parallel data converter, a multiplexer, a time rate FIFO buffer memory, and an output interface. The present invention further includes a control circuit that receives a synchronous clock signal from the data source and derives therefrom a plurality of clocking signals. In addition, the control circuit utilizes the status of the fullness of the FIFO buffer memory to initiate a read signal to read the information from the FIFO buffer memory.

Thus, the present invention provides a circuit in which the read rate and size of the FIFO memory can be determined by the maximum transfer rate to the receiving mainframe or minicomputer systems. These and other advantages and features of the present invention will be described in greater detail in the following detailed description of the preferred embodiment contained herein below.

DETAILED DESCRIPTION OF THE PRESENTLY PREFERRED EMBODIMENT

With reference now to the figures wherein like numerals represent like elements throughout the several views, an interface device or Direct Ingest System (DIS) 9 is depicted. In particular, reference is made to FIG. 1 in which a block diagram of DIS 9 is depicted receiving data and control information from a data source 10 and delivering the data together with generated control signals to a mainframe computer environment described in greater detail below. Data source 10 provides a constant data stream at a high rate and can be, for example, a polar-orbiting TIROS-N or geostationary GOES satellite. These data sources are typical and provide high speed digital data in serial form. Other types of data sources can include commercial communication circuits and other electronic devices possessing synchronous serial interfaces. In a preferred form of the present invention, data source 10 provides not only data, but also a synchronous clock signal. Typical data transfer rates produced by data source 10 and receivable by DIS 9 are rates of up to 3,000,000 bits per second.

Figure 1:
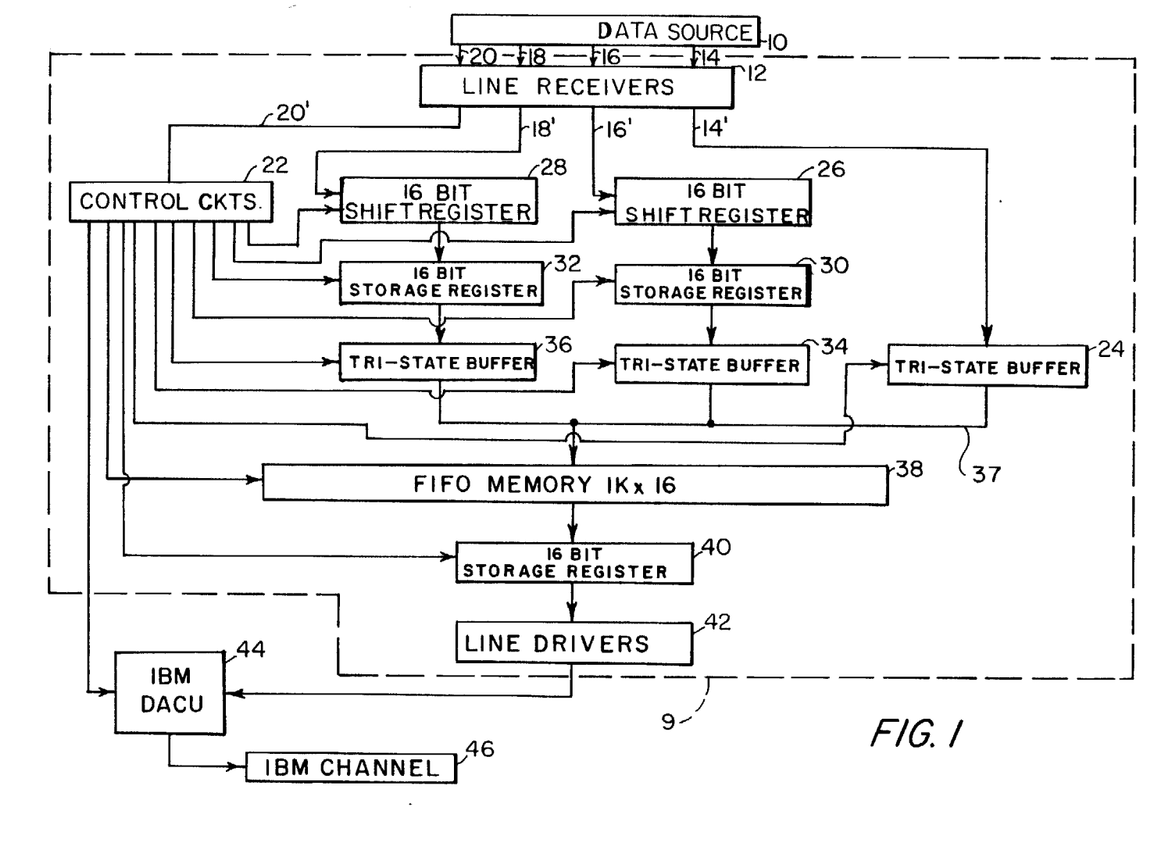
FIG. 1 is a schematic block diagram of an embodiment of a data direct ingest system utilizing an interface device according to the present invention.

The present invention will be described with respect to a preferred data source which is a Fairchild-Weston Frame Synchronizer (FS) model 814-02. Such a frame synchronizer can process data from a TIROS-N satellite and provide the output to DIS 9 of the present invention. The frame synchronizer receives Advanced Very High Resolution Radiometer (AVHRR) data and provides three types of data plus control signals. The three types of data are AVHRR PCM NRZL data, quality control data for parity correlation, and status information defining specific characteristics of the data. The control signals include a data clock signal, a frame start signal and a frame end signal, the latter one not being utilized by the present embodiment of the invention.

As shown in FIG. 1, the data is provided from data source 10 along lines 14, 16 and 18 for respectively the status data, the quality data, and the AVHRR data. In addition, a single, clock signal is provided along line 20. The DIS of the present invention receives the data and clock pulses in a plurality of line receivers 12. As described in greater detail herein below, line receivers 12 are conventional differential amplifiers. From line receivers 12, the data and clock signals are provided along corresponding lines 14', 16', 18', and 20'. Clock signal line 20 transmits the single clock signal to a control circuit 22 which divides the single frequency clock signal into a plurality of different frequency synchronous clocking signals. A first clocking signal is used to activate a tri-state buffer 24 which receives the status data from line receivers 12 along line 14'. A second clocking signal is used to clock the serial quality data being transmitted by line 16' into a 16 bit shift register 26. A third clocking signal is used to clock the serial AVHRR data being transmitted by line 18' to a 16 bit shift register 28.

The quality data and the AVHRR data are received, transformed and temporarily stored by substantially similar subcircuits comprised of the aforementioned shift registers 26 and 28 and further by corresponding, parallelly loaded, controllable 16 bit storage registers 30 and 32, and corresponding, controllable tri-state buffers 34 and 36, respectively. Thus, each subcircuit comprised of a shift register, a storage register, and tri-state buffers, under the control of control circuit 22, takes the corresponding serial data, makes a data word of a predetermined length which is 16 bits in the present embodiment, in the corresponding shift register, transfers the bits in parallel as the data word to the storage register, temporarily stores the word, and then at the proper time, also as determined by control circuit 22, sends the word in parallel onto a data bus 37 by activating the tri-state buffer.

As mentioned above, control circuit 22 and each subcircuit form a series-to-parallel data converter having a predetermined 16 bit word length, but selectable to any desirable word length. Shift registers 26 and 28 are comprised of two conventional serial-in, parallel-out shift and storage registers that are tied together to form a 16 bit shift register. Storage registers 30 and 32 are comprised of two conventional eight bit parallel-in parallel-out, controllable registers tied together to form a 16 bit register. Both shift registers 26 and 28 and storage registers 30 and 32 have an asynchronous clock input used to clock the data. As presently configured in this embodiment, data is constantly being serially clocked into shift registers 26 and 28 by the externally supplied clock signal and the parallel outputs therefrom are constantly being supplied to storage registers 30 and 32, respectively. Then when the shift register is full, the contents of the storage register is "frozen" and passed through the tri-state buffers 34 and 36 and onto bus 37. Tri-state buffers 24, 34, and 36 are also conventional circuits.

The outputs of tri-state buffers 24, 34, and 36 are joint connected to data bus 37 and provide the input to a controllable First-In-First-Out (FIFO) conventional buffer memory 38. Thus, the data provided by line receivers 12 is multiplexed by the corresponding buffers 24, 34, or 36 so that only one type of data at a time is presented at the input of buffer memory 38. Buffer memory 38 in the present embodiment is a conventional FIFO memory having a 1k×16 bit configured dimension. Obviously, other sizes of memory can be provided.

Buffer memory 38 can be asynchronously read to provide data on a FIFO basis even while data is being written into it. The output from buffer memory 38 is connected in parallel to a controllable, temporary storage register 40. The output from storage register 40 is connected to a plurality of conventional line drivers 42. The output from line drivers 42 is also the data output from DIS 9 and they are connected to a utilization device, such as a Device Attachment Control Unit (DACU) 44. Control circuit 22 also provides handshaking control signals necessary to interface with DACU 44. Obviously, if the control and timing signals described below are modified, the presently configured DIS 9 can be connected to other computer interface control systems.

DACU 44, in turn, is connected to a channel 46 utilized in a mainframe computer environment, such as an IBM 4300 series system. One example of a DACU that can be utilized with DIS 9 of the present invention is an IBM DACU Model 7170.

Thus, a DIS in accordance with the present invention has been described in general terms for receiving, transforming and transferring high rate data in a manner acceptable to the architecture of a mainframe computer system such as the IBM 4300 series mainframe computer systems. The present invention receives bit serial data at a high speed, such as at 1.3308 mbs, assembles the bits into a word, such as a 16 bit long word, and stores the assembled word into a FIFO buffer memory 38. Buffer circuitry connected to the output of buffer memory 38, in turn, provides the data with output characteristics in accordance with predetermined specifications, such as the Digital Equipment Corporation UNIBUS specifications. Alternatively, the DIS of the present invention can be interfaced directly to any computer system utilizing the UNIBUS specifications, or connected to high speed parallel input-output interfaces using the data ready-acknowledge control signals.

With reference to FIGS. 2-5, a detailed schematic drawing of the data direct ingest system depicted in block diagram form is depicted with output interfacing that is compatible with an IBM 4300 series mainframe computer system utilizing a DACU and input channel. It will also be assumed for discussion of FIGS. 2-5 that the input data is being received from a frame synchronizer that produces at least a frame start signal, received as part of the status word at an input terminal 102 (FIG. 3a). Connected to input terminal 102 to receive the frame start signal is a differential amplifier 104. The remaining inputs to terminal 102 and a further terminal 106 in FIG. 3b are the remaining data inputs that comprise the status data. In all cases, the individual inputs are provided to individual differential amplifiers 108a-108g connected to terminal 102 and differential amplifiers 110a-110h connected to terminal 106. The components of the status data that are connected to terminals 102 and 106 are depicted in Table 1 and reflect the particular situation of the data being supplied from a TIROS-N satellite through a frame synchronizer. Obviously, a different data source system would have other status inputs.

TABLE 1

Figure 3A:
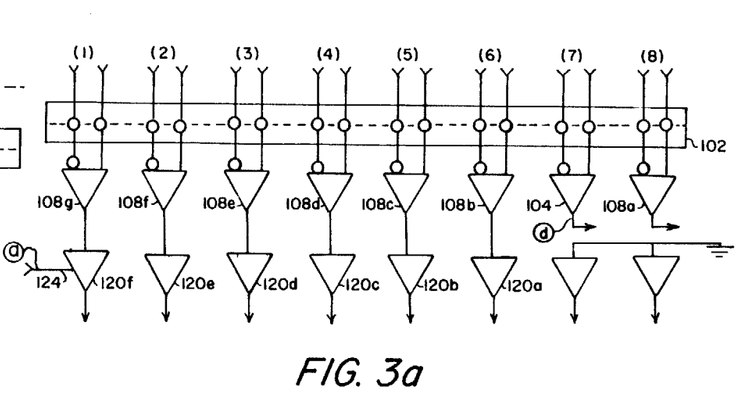
FIG. 3a and FIG. 3b are electrical schematic diagrams of the line receivers and buffers for additional input to be multiplexed with the data received by the other circuits depicted in FIG. 1.
Figure 3B:
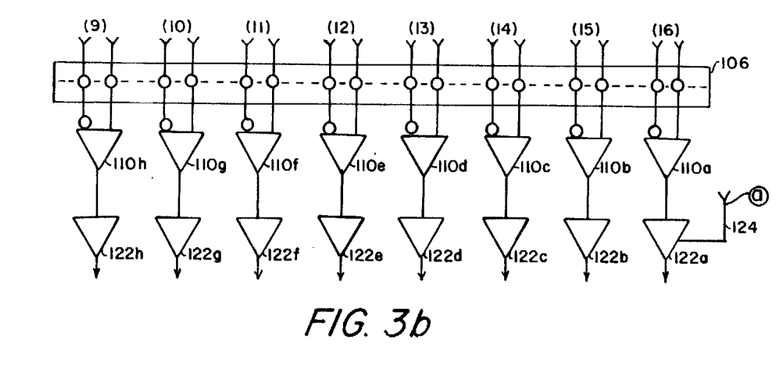
Figure 4:
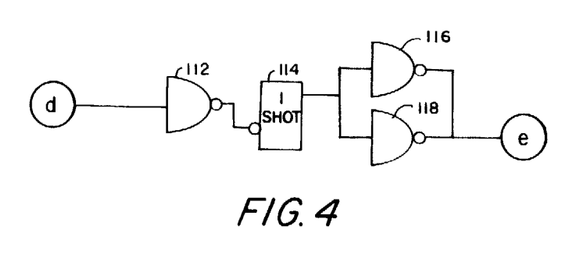
FIG. 4 is an electrical schematic diagram of a reset circuit connected to the circuit depicted in FIG. 2.

| FIG. 3 No. | Status Signal | FIG. 3 No. | Status Signal |
|---|---|---|---|
| (1) | Space Craft (3) | (9) | Data Type 3 |
| (2) | Space Craft (2) | (10) | Data Type 2 |
| (3) | Space Craft (1) | (11) | Data Type 1 |
| (4) | Data Mode | (12) | P/N FLAG |
| (5) | Frame Sync. | (13) | Data Source |
| (6) | Operate Status | (14) | Data Source |
| (7) | Frame Start | (15) | Data Direction |
| (8) | Frame End | (16) | Space Craft (4) |

The frame start signal initiates the data receive sequence and is used to initialize DIS 9. The output from differential amplifier 104 is unbuffered and provided directly to the input of an inverter 112, depicted in FIG. 4. Inverter 112 is connected to the clock input of a one shot or monostable multivibrator 114. Multivibrator 114 provides a 0.5 microsecond pulse that drives two power NAND gates 116 and 118 whose outputs are connected together in order to provide the necessary power to reset the counters in control circuits 22, described herein below with respect to FIG. 2.

All of the other outputs from differential amplifiers 108 and 110, FIGS. 3a and 3b, are connected to corresponding, individual tri-state buffers 120a-120f and 122a-122h, respectively. A common enable line 124 provides a control signal to simultaneously enable all tri-state buffers 120a-120f and 122a-122h. The outputs from these tri-state buffers are connected to corresponding inputs of buffer memory 38, FIG. 2 in a multiplexed fashion, as described in grater detail below.

Figure 2A:
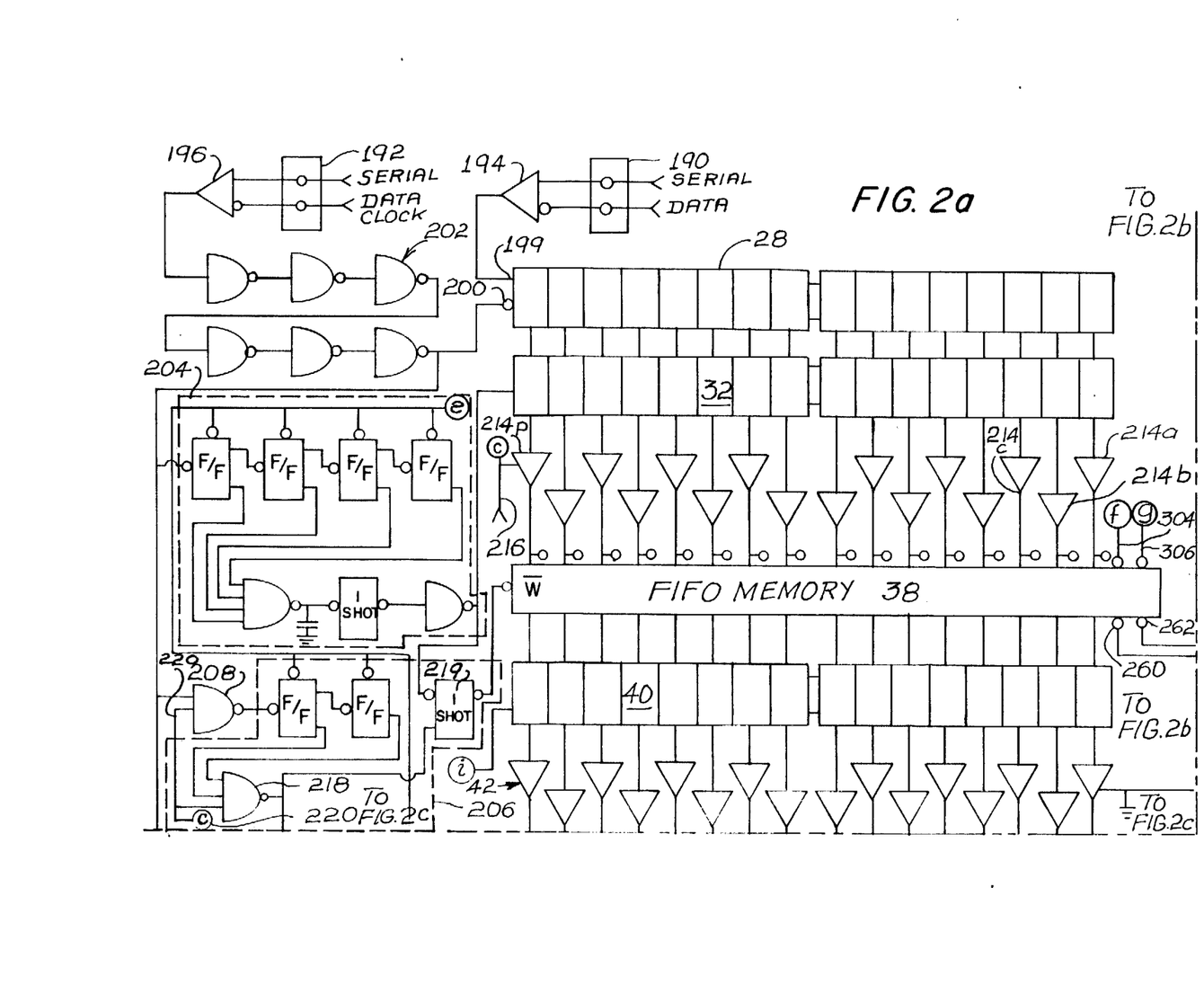
FIG. 2a, FIG. 2b, FIG. 2c, and FIG. 2d are together an electrical schematic diagram of the FIFO buffer memory and most of the control, data input, data manipulation, data storage and output circuits depicted in FIG. 1.
Figure 2B:
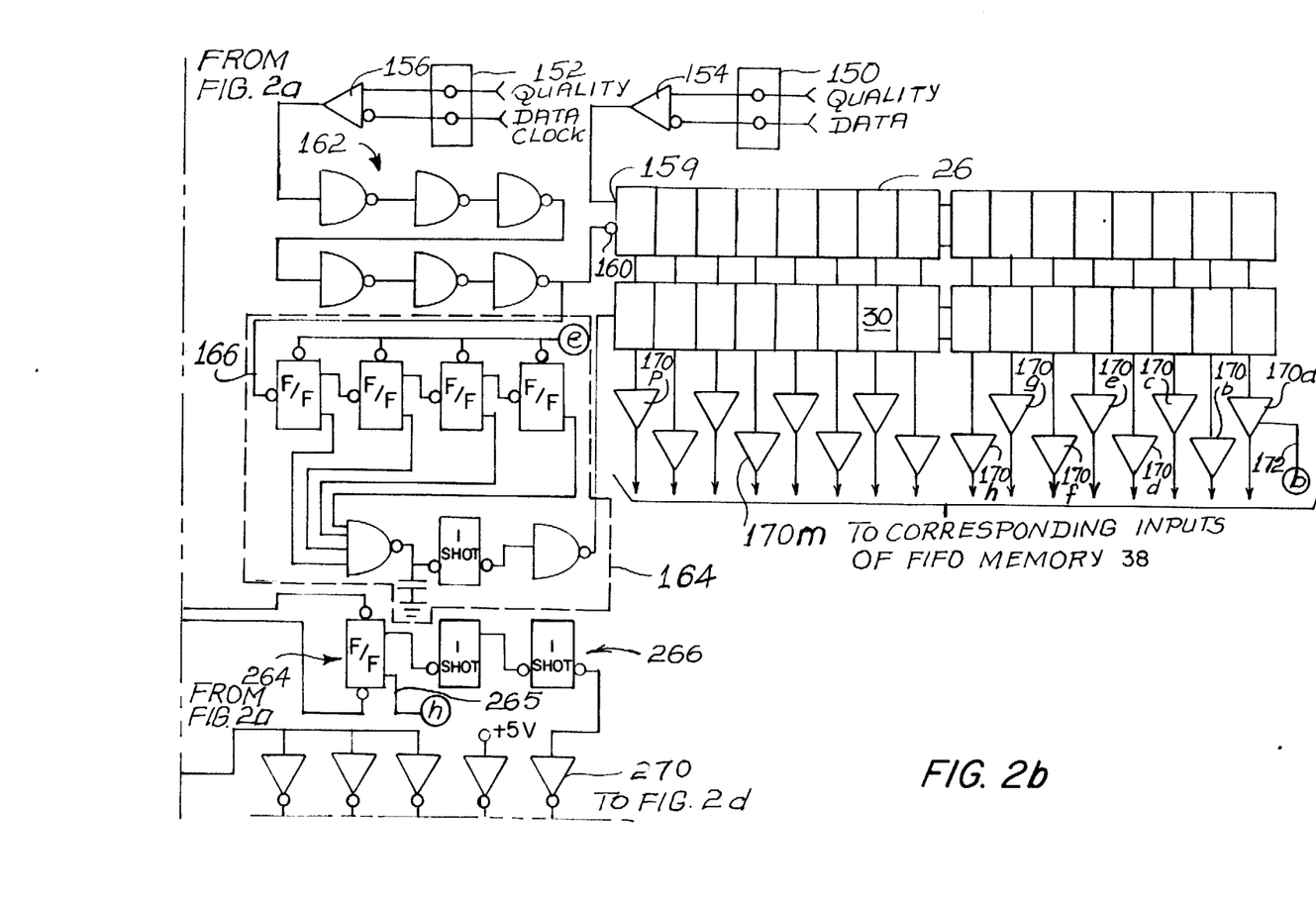

With reference now to FIGS. 2, and in particular, FIG. 2b, the quality data and the quality data clock signals are received from the frame synchronizer at terminals 150 and 152, respectively. Connected to terminals 150 and 152 are two differential amplifiers 154 and 156 which process the signals. The output of differential amplifier 154 is connected to the data input 159 of quality data shift register 26. The output from differential amplifier 156 supplies the data clock to the clock input 160 of shift register 26 through a delay circuit 162 comprised of six NAND gates connected in series and whose inputs are tied together. In this way, the data is allowed to settle at data input 159 before the clocking signal of shift register 26 is supplied at clock input 160.

The output of delay circuit 162 is also connected to the input of a divide by 16 divider 164 through a connecting line 166. Divider 164 is comprised of four flip-flops serially connected together through the Q output with the Q not output being connected to a decoding 4 input NAND gate. The output from the NAND gate feeds a pulse shaping monostable multivibrator or one shot having a pulse duration of one microsecond. The output of the one shot is coupled to the enable input of storage register 30 through an inverter. Thus, storage register 30 does not receive an input from shift register 26 until 16 bits have been clocked serially into shift register 26, at which time all of the inputs to the decoding NAND gate are ones. In this manner, the high speed serial input has been converted to a 16-bit word which is then loaded in parallel into storage register 30 and held there until ready to be received by buffer memory 38. The outputs from each stage of storage register 30 are tied to corresponding inputs of buffer memory 38 through individual tri-state buffers 170a–170p. Each of the tri-state buffers 170 are connected to a common enable line 172 which receives a control signal from control circuits 22 in a manner described in greater detail herein below.

Similarly, as depicted in FIG. 2a, the serial data and its associated serial data clock are received by DIS 9 at terminals 190 and 192, respectively. The outputs of terminals 190 and 192 are connected to differential amplifiers 194 and 196, respectively, much in the same way that the quality data and quality data clock are connected. Thus, the serial data after being processed by differential amplifier 194 is sent to the data input 199 of its corresponding shift register 28 and the data clock signal after being processed by differential amplifier 196 is sent through a delay circuit 202, also comprised of six serially connected inverters, to the clock input 200 of shift register 28. The output of delay circuit 202 is also connected to the input of a divide by 16 divider 204. Divider 204 is similar to divider 164, except that the one shot has a pulse width of only 0.2 microseconds. The output from divider 204 is connected to the enable input of storage register 32 to cause the enabling thereof and the latching of the output of shift register 28. Thus, the serial data input is converted into a parallel word in the same way the serial quality data is converted.

The output from delay circuit 202 is also connected to two additional components of control circuit 22 (FIG. 1). The first component is a two input NAND gate 208, (FIG. 2a), and the other component is a divide by 8 divider 210, depicted in FIG. 2c. Gate 208 controls the operation of the multiplexing section of control circuits 22, whose outputs are used to determine the timing of the multiplexed data supplied to buffer memory 38. Thus, as with storage register 30 in FIG. 2b, storage register 32 is connected to the inputs of buffer memory 38 through individual tri-state buffers 214a–214p. As with tri-state buffers 170, tri-state buffers 214 have a single enable line 216 that is supplied with an enable signal so that all of the individual data bits comprising the data word from storage register 32 are sent through the corresponding tri-state buffers 214 at the appropriate time so that the inputs to buffer memory 38 are appropriately multiplexed.

Figure 2C:
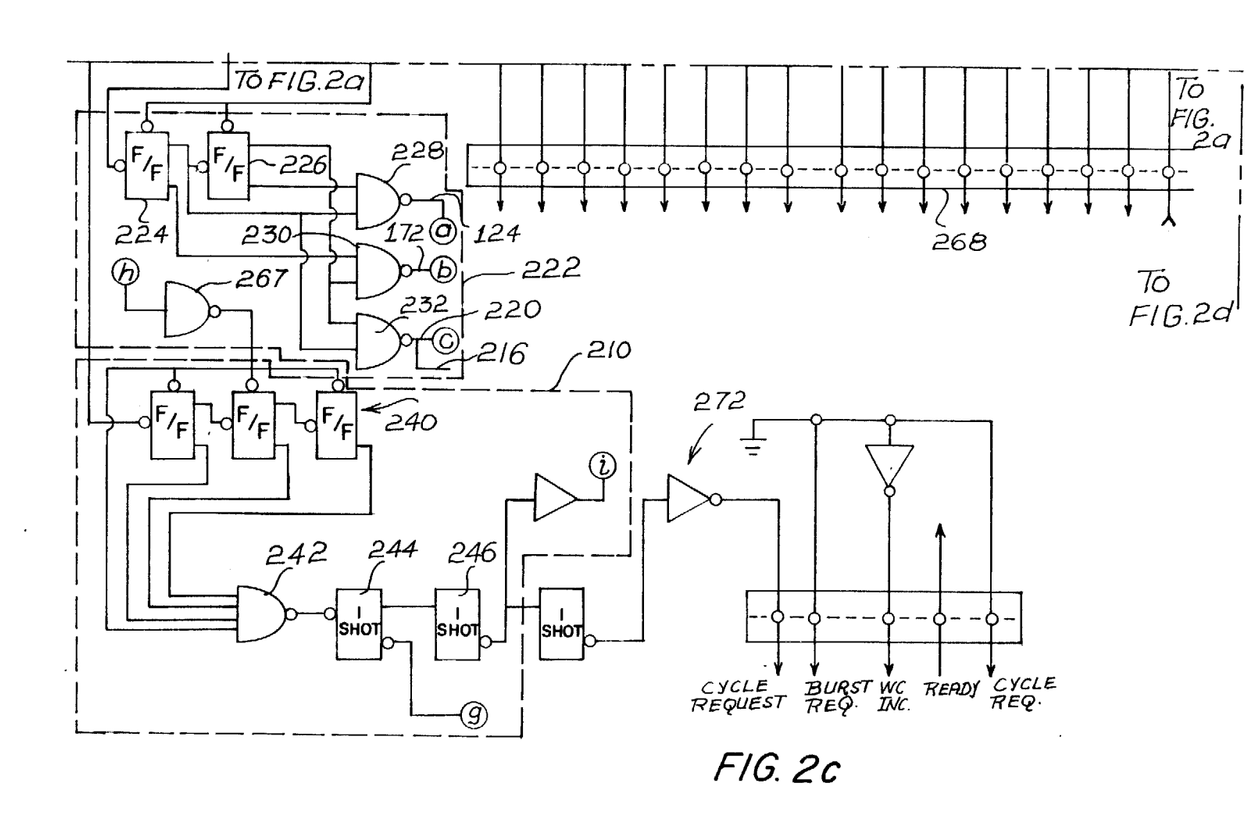
Figure 2D:
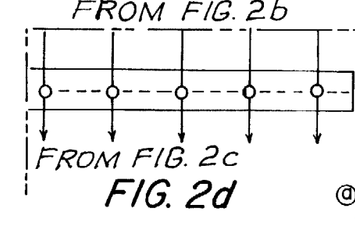

The timing signals for enabling tri-state buffers 122 (FIG. 3), 170 (FIG. 2b) and 214 (FIG. 2a) are generated in an enabling circuit comprised of a divide by four divider 206 and a decoder 222, the circuits branching FIGS. 2a and 2c. As mentioned above, the data clock signal generated from delay circuit 202 is passed through a gate 208 that is enabled, as described herein below by a signal that is generated by decoder circuit 222. Thus, the tri-state buffer enabling circuits has the ability to shut itself off by controlling the inputs through gate 208.

Divider 210 is used to generate appropriate signals, described below, to send a read signal to buffer memory 38 and to send a delayed enable signal to storage register 40. As mentioned above, with respect to FIG. 1, the output from DIS 9 is provided through a plurality of line drivers 42. In the particular embodiment depicted in FIG. 2a, line drivers 42 are simply tri-state buffers whose enable line has been tied to ground. Thus, the output from storage register 40 is always available, but through the use of hand-shaking signals, is not latched by the DACU 44 (FIG. 1) until a cycle request signal is generated by control circuits 22 (also described in greater detail below).

The circuit for generating the multiplexing signals "a", "b" and "c" respectively sent to tri-state buffers 108 and 110 for the status word, to tri-state buffers 170 for the quality data and to tri-state buffers 214 for the data will now be described. The output from gate 208 is coupled to the input of divider 206. Divider 206 is comprised of two serially connected flip-flops whose Q not outputs are connected to two inputs of a three-input NAND gate 218. The third input of gate 218, as mentioned above, is multiplexing signal "c," thereby providing a mechanism for disabling NAND gate 218. Signal "c" is also used to enable NAND gate 208. The output from NAND gate 218 is connected to the clock input of a one shot 219 having a one microsecond pulse width. The output of one shot 219 provides the write signal to buffer memory 38.

The output from NAND gate 218 is also sent to the input of decoder circuit 222. Decoder circuit 222 is comprised of a logic network that includes two flip-flops 224 and 226 and three two-input NAND gates 228, 230 and 232. The output from NAND gate 228 is connected to line 124 and is multiplexing signal "a". The output from NAND gate 230 is connected to line 172 and provides multiplexing signal "b." Finally, the output from NAND gate 232 is connected to line 220 which supplies the enable signals to NAND gates 208 and 218 and also to line 216 which provides the enable signal for tri-state buffers 214. Flip-flops 224 and 226 are connected to NAND gates 228, 230 and 232 such that when the flip-flops are reset, all zeroes are applied to the NAND gates, whose outputs are therefore a logical "1." Consequently, all of the corresponding tri-state buffers are disabled and NAND gates 208 and 218 are enabled. As mentioned above, flip-flops 224 and 226, as well as the flip-flops of dividers 204 and 206 are reset to logical zero signals at their Q outputs by timing signal "e" developed by the reset circuit depicted in FIG. 4 from the frame start signal provided by the frame synchronizer.

When the frame start signal is received and decoding NAND gate 218 has all ones added to its inputs, the zero from the output clocks one shot 219, which after a one microsecond delay provides a write pulse to buffer memory 38. In the interim, the same logical "zero" output from NAND gate 218 clocks flip-flop 224 of decoder circuit 222. This provides a logical "zero" to the other input of NAND gate 228 thereby providing a logical "zero" output as multiplexing signal "a" while the outputs from NAND gates 230 and 232 remain unaffected. Signal "a" thus enables tri-state buffers 120 and 122 and permits the status word to be multiplexed and written into buffer memory 38 after one shot 219 times out.

After four more data clock pulses being sent through NAND gate 208, the status of flip-flop 224 is changed again, thereby providing a logical zero for multiplexing signal "b" and disabling NAND gate 228 which provides a logical "one" signal and disables the previously enabled tri-state buffers 120 and 122. Again, one shot 219 is triggered and a write signal, after the one microsecond delay, is provided to FIFO memory 38, thereby permitting the quality word to be written into buffer memory 38 from storage register 30 (FIG. 2b) through the enabled tri-state buffers 170.

Finally, at the 12th data clock pulse provided by delay circuit 202 to NAND gate 208, decoder 222 is set such that multiplexing signals "a" and "b" are at logical "one" and multiplexing signal "c" is at a logical "zero". At this time, NAND gate 208 is disabled upon the application of a logical zero by line 220, and NAND gate 218 is also disabled, but only after a clocking signal is provided to one shot 219. This also provides a write signal to buffer memory 38 shortly after tri-state buffers 214 have been enabled, thereby loading data into buffer memory 38. With NAND gate 208 being disabled, decoder 222 is also disabled and the multiplexing signals remain in their present state, thereby allowing the writing of all of the data into FIFO memory 38 irrespective of the data clock signals. The circuit remains in this condition until the next frame start signal is received, which initializes the control circuit and permits the process to be repeated.

The operation of the read signals from buffer memory 38 proceeds asynchronously, and sometimes simultaneously, with the writing of information to memory 38 as described hereinabove. This is accomplished by divider 210, FIG. 2c. Divider 210 is comprised of three serially connected flip-flops 240, the Q not outputs of which are connected to three of the four inputs of a four-input NAND gate 242. The fourth input to NAND gate 242 is an enable signal that is generated as described herein below. The output from gate 242 triggers a one shot 244 that produces a one microsecond pulse. The Q not output of one shot 244 becomes timing signal "g" which is used to enable buffer memory 38 as described below. The Q output of one shot 244 is coupled to a second one shot 246 that has a 0.5 microsecond pulse connected from the Q not output thereof through an inverter to become timing signal "i." This timing signal is applied to the latching input of storage register 40, thereby latching the output from buffer memory 38. The output from one shot 246 is also provided to a further one shot, having a one microsecond pulse, which is used to produce a hand-shaking interface signal, called a cycle request signal, used by DACU 44

(FIG. 1). Thus, eight data clock pulses after divider 210 is enabled, and continuously thereafter so long as a data clock signal is being provided, FIFO memory 38 is being sequentially read.

Divider 210 is enabled by a signal produced by buffer memory 38 when the memory is full. Buffer memory 38 provides a data empty signal at output 260 and a data full signal at output 262. Outputs 260 and 262 are connected to the reset and set inputs of a flip-flop 264, respectively (FIGS. 2a and 2b). The Q not output from flip-flop 264 is connected to a reset line 265 which carries timing signal "h". Timing signal "h" is applied through a NAND gate 267 to disable inputs of flip-flops 240 and enable the lines of NAND gate 242 (FIG. 2c).

The Q output from flip-flop 264 is also used to provide a timing signal to DACU 44 (FIG. 1) after being conditioned by two one shots 266 (FIG. 2b) and a buffer 270. The two one shots 266 produce, respectively, six microsecond and 0.5 microsecond pulses.

Figure 5:
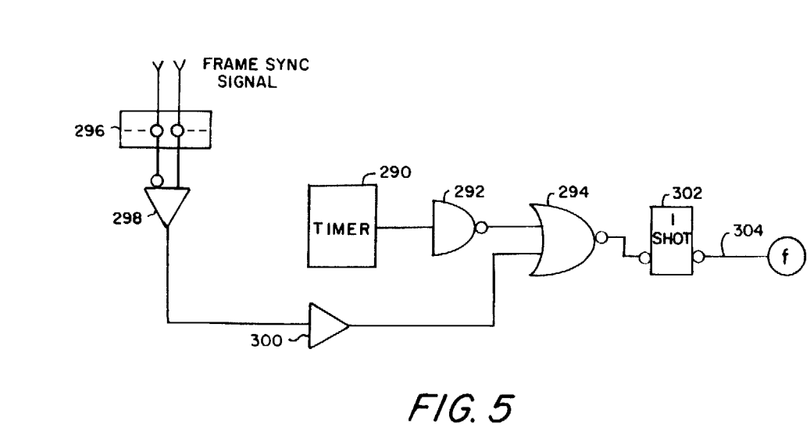
FIG. 5 is an electrical schematic diagram of a timing circuit used to reset the FIFO memory of FIG. 2.

With reference now to FIG. 5, a circuit is disclosed for producing timing signal "f" that is used to inhibit buffer memory 38 when there is no data being transmitted. A 100 kilohertz timer 290 generates a clock signal and is connected to the input of an inverter 292. The output of inverter 292 is connected to one input of a two input NOR gate 294. The other input to NOR gate 294 is derived from the frame sync signal produced by the frame synchronizer and provided at terminal 296. A differential amplifier 298 is connected to terminal 296 and receives and processes the frame sync signal. An inverter 300 is connected between differential amplifier 298 and the enable input of NOR gate 294. The output of gate 294 is connected to the clock input of a one shot 302, the Q not output from which is connected to line 304. Line 304 applies timing signal "f" to the reset input of buffer memory 38. Thus, buffer memory 38 is held by the 100 kilohertz signals in a reset mode when no data is being received. Before data is received, frame sync signal is first received and disables gate 294, which in turn blocks the generation of timing signal "f."

In summary, buffer memory 38 is a flexible FIFO memory that is expandable in depth and in word size, that permits asynchronous read/write operations, and that provides memory full and memory empty flags. The data is written into memory at the receive data rate, and in the present embodiment is read out twice as fast. At a writing rate of 1.3308 mbps, approximately 12 milliseconds are required to fill buffer memory 38. The reading of buffer memory 38 is controlled by the memory full and empty flags and may occur asynchronously and simultaneously with the writing to the memory so long as a data clock signal is being received. In one embodiment, the read cycle is 24 milliseconds long, 12 milliseconds each being used for a data read period and for a rest period. The rest period permits DACU 44 sufficient time to absorb the data and satisfy the timing requirements of channel 46.

Thus, there has been described an interface circuit which can receive data broadcasted at extremely high rates and provide that data together with appropriate control signals to a utilization device. Obviously, additional adaptations and modifications of the present invention would be obvious to those skilled in the art.

I claim:

1. An interface device for the synchronous receiving and transferring of data at high rates from a data source that provides both the data and a synchronization signal, said interface device comprising:

a First-In-First-Out buffer memory connectable to the data source for temporarily storing data therefrom., said buffer memory being able to hold a predetermined amount of data and to produce a first fullness signal when a first amount of data is stored therein and a second fullness signal when a second amount of data that is less than said first amount of data is stored therein;

master clock signal generating means responsive to the synchronization signal for generating a master clock signal;

a clock signal producing circuit means responsive to said master clock signal for producing a first clocking signal for clocking the data into said buffer memory at a first rate and for producing a second clocking signal for clocking data out of said buffer memory at a second rate that is faster than said first rate; and means for selectively controlling the clocking out of data from said buffer memory such that data begins to be clocked out when said buffer memory produces said first fullness signal (i.e. said buffer memory reaches a first degree of fullness) and such that the data ceases to be clocked out when said buffer memory produces said second fullness signal (i.e. said buffer memory reaches a lower, second degree of fullness).

2. An interstitial device as claimed in claim 1 wherein first clocking signal rate is a constant.

3. An interface device as claimed in claim 1 wherein the data source provides a serial stream of first data bits, and wherein said interface device further includes a serial-to-parallel converter.

4. An interface device as claimed in claim 1 wherein the data source provides a first and second stream of data bits; and said interface device further includes multiplexing means for selectively storing said first and second stream of data bits in said buffet memory.

5. An interface device as claimed in claim 4 wherein at least said first stream of data bits is provided in serial form by the data source, and wherein said interface device further includes a serial-to-parallel converter connected between said multiplexing means and the data source.

6. An interface device as claimed in claim 1 wherein said controlling means also generates control signals that define a train of equal timing periods, each said timing period comprised of a read subperiod and a non-read subperiod that are of the same duration for each timing period, said control signals thus controlling the reading of data from said buffer memory such that data is read from said buffer memory for the same predetermined amount of time during each timing period, and wherein said buffer memory can independently receive data from the data source and can be independently read under the control of said controlling means.

7. An interface device as claimed in claim 1 wherein the data source provides serial data, a data clock signal and an in initiation signal to said interface device, and wherein said interface device further includes a serial-to-parallel converter means for converting serially received data into words of parallel data, and a controllable switch means for applying parallel converted data words to said buffer memory.

8. An interface device as claimed in claim 7 wherein said converter means includes a temporary storage register, and wherein said clock signal producing circuit means utilizes said data clock signal to produce said first clocking signal to load data into said converting means and to produce a third clocking signal to shift a created parallel word into said register.

9. An interface device as claimed in claim 8 wherein said device further includes an output register, and wherein said clock signal producing circuit means utilizes said data clock signal to generate a fourth clocking signal to load data from said buffer memory 10. An interface device for the synchronous receiving and processing of a first and a second serial data stream of data bits transmitted at high rates from a data source, said data source also transmitting a synchronization signal, said interface device comprising:

converting means for receiving and converting said serial streams of data bits into data words of parallel bits;

a First-In-First-Out buffer memory that is loaded with and temporarily stores said data words;

an output register means connected in parallel to receive the data output from said buffer memory;

a clock signal producing means responsive to the synchronization signal for producing a plurality of synchronized clocking signals, a first clocking signal transmitted to said converting means and used thereby for converting said data bit into data words, a second clocking signal transmitted to said buffer memory for clocking out said temporarily stored words asynchronously with respect to the loading of said buffer memory, a third clocking signal supplied to said multiplexer means for selecting which received serial data stream is to be transmitted to said buffer memory, and a fourth clocking signal supplied to said output register means for latching said buffer memory data output;

means for detecting when said buffer memory reaches a predetermined state of fullness and for producing a fullness signal indicative of said buffer memory reaching said state; and means connected to said detecting means and responsive to said fullness signal for enabling the latching of data from said buffer memory by said output register.

11. An interface device as claimed in claim 10 and further including means for inhibiting said buffer memory when no data is to be sent to said interface device.

12. A method for receiving and temporarily storing a stream of bits of data broadcasted together with a clock signal and other data by a data source at high rates and for providing the data to a utilization device, the method comprising:

generating a plurality of timing control signals by using the received clock signal;

clocking the received data into a shift register with a first generated timing control signal to form a data word;

clocking out said formed data word in parallel using a second generated timing control signal and temporarily storing said word in a storage register;

multiplexing said formed data word with other received data using a third generated timing control signal and storing the multiplexed data in a first-in-first-out buffer memory at a first clocking rate;

detecting the degree of fullness of said buffer memory and generating a flag when said buffer memory reaches a predetermined amount of fullness; and using said flag to cause a fourth generated timing control signal to be provided to said buffer memory to clock out said stored data on a FIFO basis at a rate greater than said data is clocked into said buffer memory.

13. A method as claimed in claim 12 wherein said data source also provides a synchronization signal; and further comprising:

using said received synchronizatin signal to initialize the generation of said control signals;

and inhibiting the genration of said third, multiplexing timing control signals after the first multiplexed data has been loaded into said buffer memory so that said other received data can be loaded into said buffer memory.

* * * * *